May 10, 1960 E. J. SCHNAITTER ET AL 2,936,085
COUPLING HEAD LATCH MECHANISM FOR VEHICLE DUMPING APPARATUS
Filed Oct. 2, 1958 3 Sheets-Sheet 1
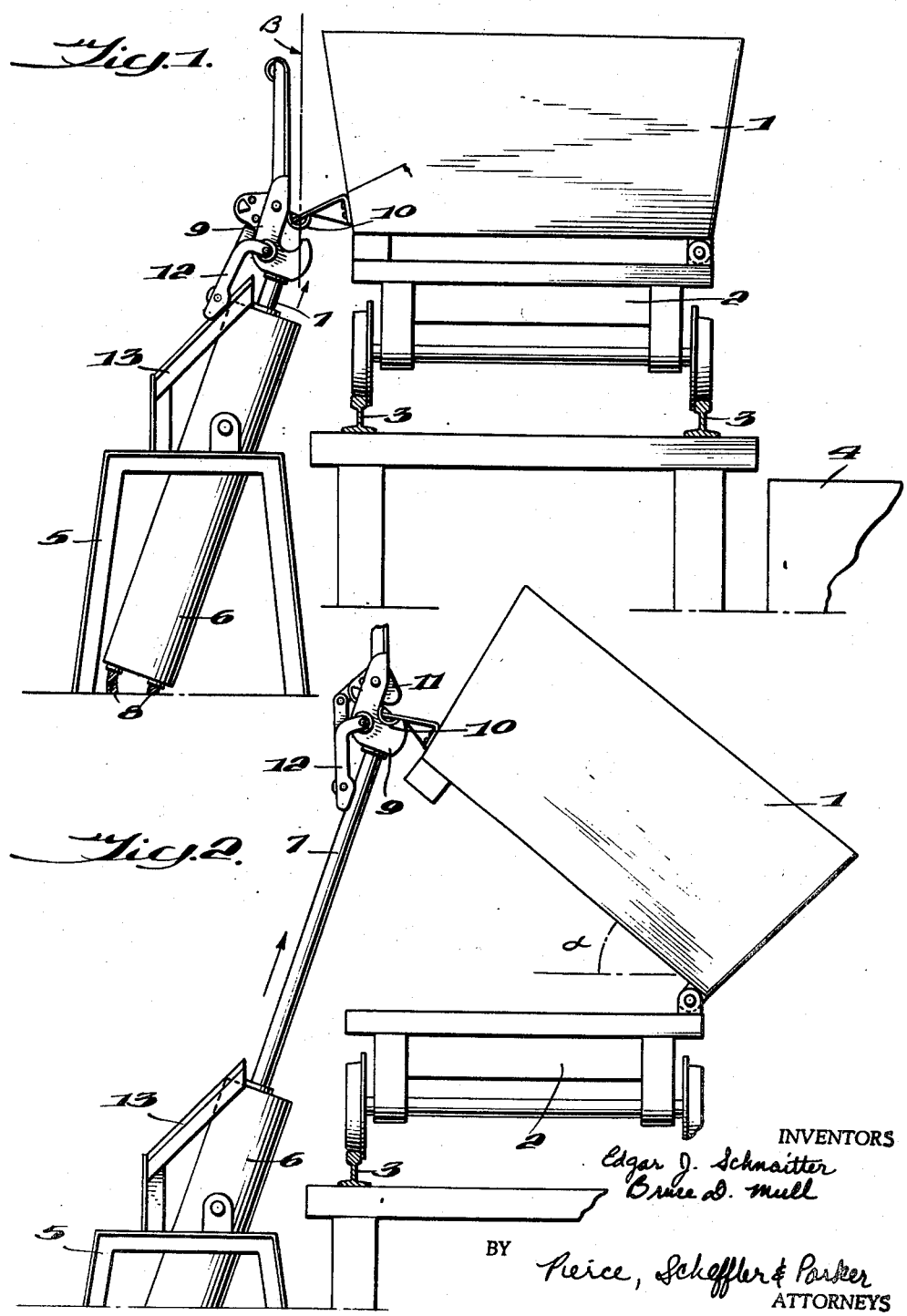
INVENTORS
Edgar J. Schnaitter
Bruce D. Mull
BY Peirce, Scheffler & Parker
ATTORNEYS

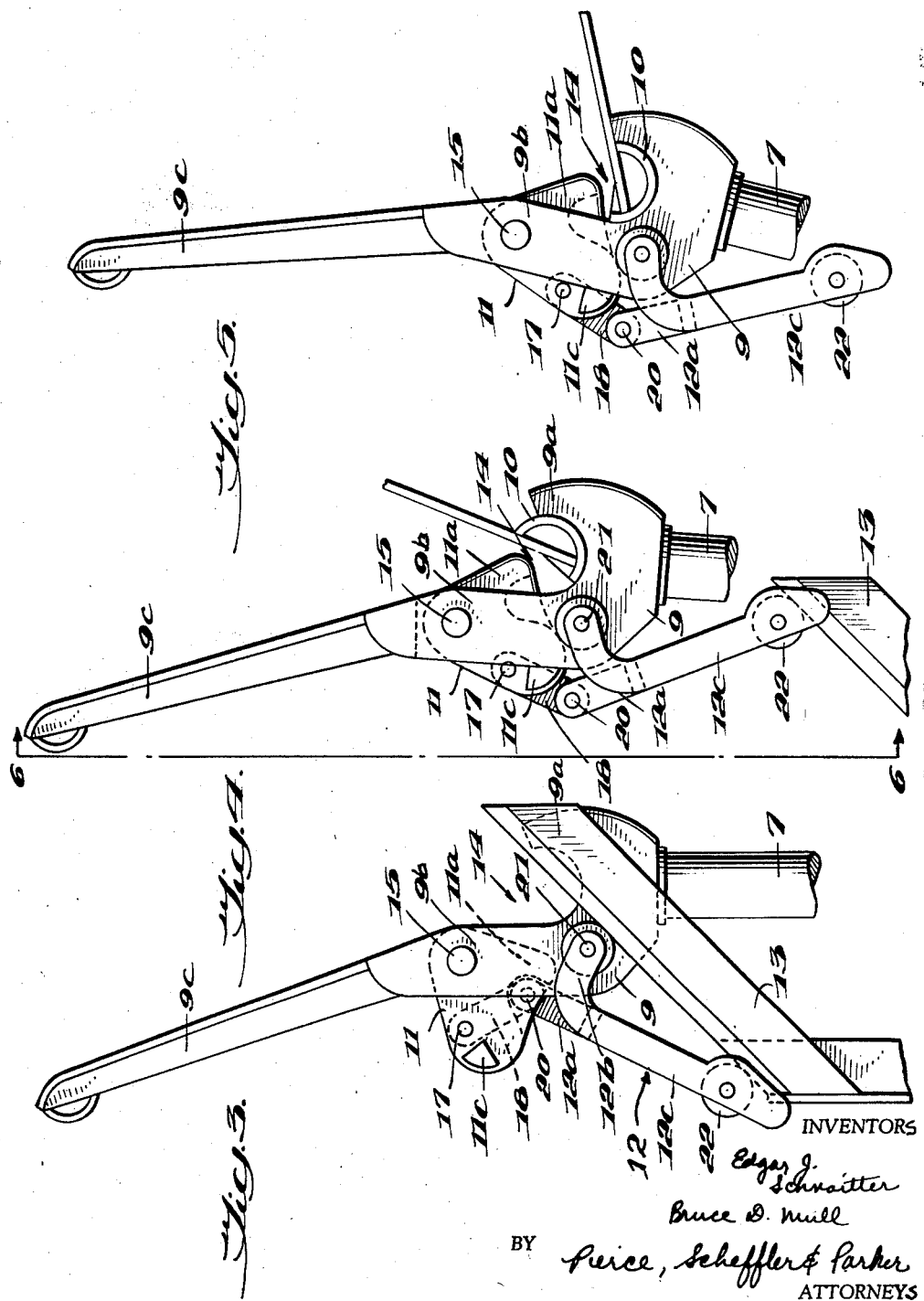

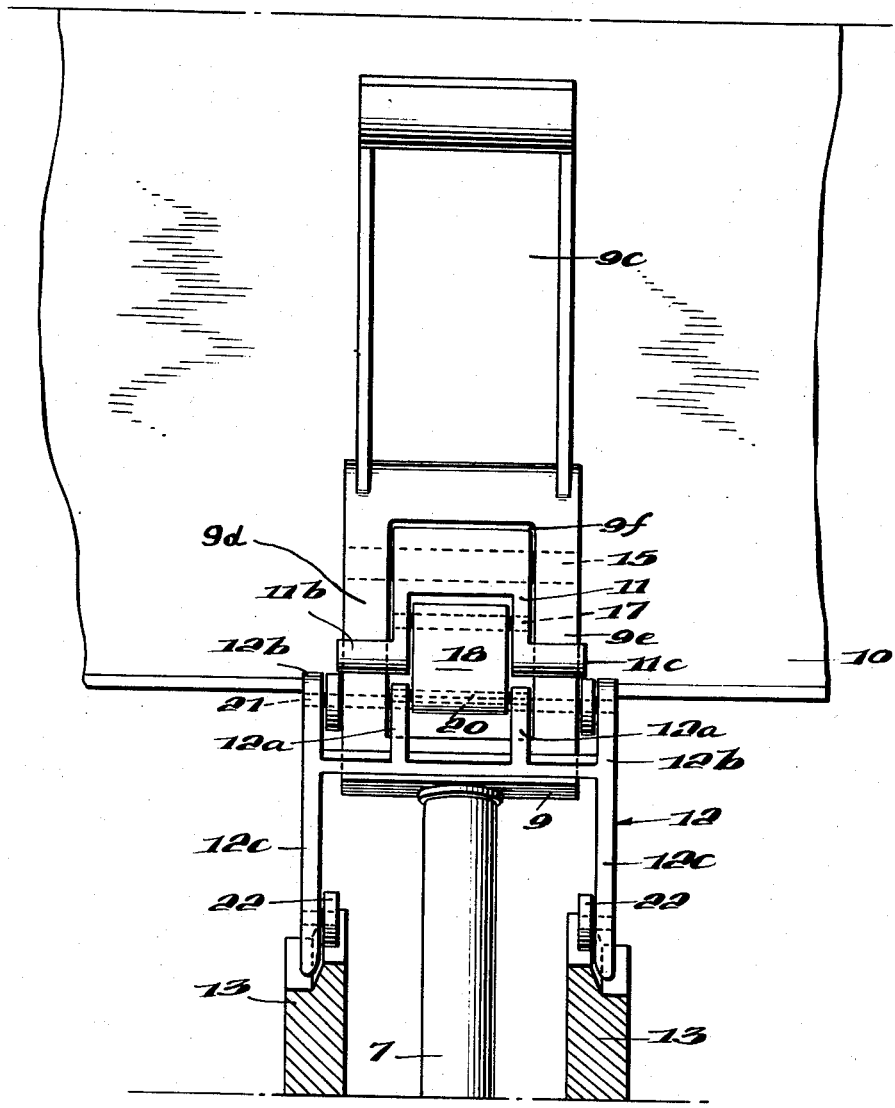

United States Patent Office 2,936,085
Patented May 10, 1960

2,936,085

COUPLING HEAD LATCH MECHANISM FOR VEHICLE DUMPING APPARATUS

Edgar J. Schnaitter and Bruce D. Mull, Hoyt Lakes, Minn., assignors to Erie Mining Company, Hibbing, Minn., a corporation of Minnesota Application October 2, 1958, Serial No. 764,808

6 Claims. (Cl. 214—64)

This invention relates generally to a railway ore car dumping apparatus and more particularly to a gravity-type cam-controlled latch mechanism for ensuring positive engagement of the coupling head of hydraulic cylinder car-tilting means with the bail ear of the car body.

It is well known in railway vehicle dumping mechanisms to provide hydraulic cylinder means for tilting a vehicle body relative to its chassis to discharge the contents from the body. Teachings in the prior art have also been presented of a coupling head secured to the end of the piston of a pivotally-mounted hydraulic cylinder and adapted to contact a bail ear on the car body to lift the body about its pivot axis to a fully tilted position. These known types of coupling heads have the drawback that the engagement between the bail and the coupling head is insecure during the first half of the dumping cycle, and (when dumping loads containing large rocks which shift when the dumping commences) considerable damage to the bail ear coupling mechanism results from incomplete engagement of the coupling head. Often the bail ear is completely torn from the car upon impacts and resulting torsional stresses, and when cars with damaged bails are dumped, the head often is disengaged from the bail and slips under the car, resulting in dumping of the car without any control. When the dumping head falls under the car, production is stopped and often the piston rod is bent, requiring removal and repair of the dumping cylinder.

The primary object of the present invention is to provide an improved coupling head construction having novel latch means for maintaining positive engagement of the coupling head with the bail ear during the greater portion of the dumping motion of a tilting-body vehicle.

Still another object of our invention is to provide a latch mechanism for a car dumping coupling head having gravity-controlled linkage means for positioning the latch in a locking position to maintain the car bail ear in engagement with the coupling head over the greater extent of car tilting movement.

Another object of our invention is to provide a gravity-controlled latch mechanism for the coupling heads of car dumping hydraulic cams, which latch mechanism may be temporarily displaced to an unlocked position by the car bail ear to permit subsequent engagement of the car bail ear with the coupling head at any dumping angle of the car body.

Another object of our invention is to provide a gravity-controlled coupling head latch mechanism having fixed cam means for displacing the latch to an unlocked position when the cylinder head is lowered to return a tilting car body to its normal horizontal position.

Other objects and advantages of our invention will become more apparent from a study of the following specification when considered in conjunction with the accompanying drawings in which:

Fig. 1 is a generally diagrammatic elevational view of the car dumping mechanism in its initial condition prior to dumping;

Fig. 2 is a generally diagrammatic elevational view of the car dumping mechanism in its full-dumping state;

Fig. 3 is a detailed elevational view of the coupling head in its initial state of Fig. 1 with the latch operating linkage in engagement with the stationary guide cam;

Fig. 4 is a detailed elevational view of the coupling head when the railway car body has been raised about 5° from the initial position of Fig. 1;

Fig. 5 is a detailed elevational view of the coupling head when the car body has been raised to the position of Fig. 2; and Fig. 6 is a partly-sectioned rear view of the coupling head taken along line 6—6 of Fig. 4.

Referring now more particularly to Figs. 1 and 2, the ore car body 1 is pivotally connected to the wheeled chassis 2 mounted for travel upon the rails 3 adjacent the primary ore crusher 4.

Pivotally connected to the rigid frame 5 on the opposite side of the rail bed from the crusher 4 is the hydraulic cylinder 6 having piston rod 7 slidably extending from the upper end thereof. Hydraulic fluid lines 8 control the longitudinal movement of the piston within the cylinder in accordance with suitable valve control means (not shown).

Secured to the upper end of the piston rod 7 is the coupling head 9 having a generally U-shaped or hooked configuration and adapted to engage the bail ear 10 extending downwardly and outwardly from the ore car body 1 at an angle $\beta$ with respect to the vertical plane. When the crusher operator actuates the cylinder 6 to move the piston rod 7 and coupling head 9 upwardly, the ore car body 1 will be progressively tilted until it reaches its full dumping position shown in Fig. 2. The angle $\alpha$ between the car body 1 and the chassis 2 is on the order of 50° for the full dumping position shown in the figure.

According to the invention (as will be explained in greater detail below) the coupling head 9 is provided with a pivotally mounted latch member 11 which extends into the opening of the U-shaped coupling head as shown in Fig. 2 to secure the bail ear 10 within the coupling head. The latch member 11 is maintained in the extended position of Fig. 2 by the weight of the latch control link 12. As will be described in greater detail, the control link 12 is arranged to come into contact with the fixed guide cam 13 secured to the rigid frame 5 when the piston rod 7 approaches the retracted position of Fig. 1 to cause pivotal movement of the latch member 11 in the clockwise direction to its unlocked position out of the opening in the coupling head 9 so that the coupling head may be readily disconnected from the car body bail ear 10.

Referring now more particularly to Figs. 3–6, the coupling head 9 has an opening 14 therein defined by the spaced upwardly projecting head portions 9a and 9b. The guide extension portion 9c secured to the head portion 9b prevents the coupling head from falling under the car in the event that the head should become disengaged from the ore car body 1. As shown in Fig. 6 the head portion 9b is divided into two parallel spaced portions 9d and 9e by the central rectangular bore 9f. Pivotally connected by pivot shaft 15 to the coupling head 9 within the central bore 9f is the bell-shaped latch member 11. The latch member 11 has a portion 11a adapted to extend within coupling head opening 14 when the latch is pivoted in the counter-clockwise direction from the position shown in Fig. 3 to the bail ear locking positions of Figs. 4 and 5. The latch member also has laterally projecting stops 11b and 11c on the rear portion thereof adapted to abut the coupling head portions 9d and 9e (as shown in Figs. 4–6) to limit the extent of travel of the latch member in the counter-clockwise locking direction.

Pivotally connected at its upper end to the latch member 11 about pivot shaft 17 is the connecting link 18. The connecting link is connected at its lower end by pivot shaft 20 to arms 12a of the control link 12. Control link 12 is also pivotally connected by pivot shaft 21 to the coupling head 9 by means of arm portions 12b. The latch control link has downwardly extending legs 12c each provided with rollers 22 adapted to ride upon the tracks of fixed guide cams 13 when the coupling head is in the positions shown in Figs. 1, 3 and 4.

The operation of the latch may now be described as follows:

When a loaded ore car is transported along the rails 3 to a position adjacent the primary crusher 4, the piston rod 7 is initially retracted within the hydraulic cylinder 6 and the coupling head 9 is positioned adjacent the fixed guide cams 13 as shown in Figs. 1 and 3. Rollers 22 are in engagement with the cam tracks to maintain control link 12 in the position shown in Fig. 3 with the latch 11 in its retracted or unlocked state.

The crusher operator then actuates suitable control valve means to supply hydraulic fluid to the cylinder 6 through the hydraulic lines 8 to cause progressive extension of the piston rod 7 until the coupling head contacts the bail ear 10 of the ore car body. Upon further extension of the piston rod 7 to the position shown in Fig. 4 (corresponding to about a 5° dumping angle $\alpha$ of the car body 1 with respect to its chassis 2—i.e., approximately a nine inch vertical displacement of the bail ear) the control link 12 will be caused by gravity to pivot in the counter-clockwise direction to the position shown in the figure. Pivot shaft 20 will thus be pivoted in the counter-clockwise direction to pull connecting link 18 downwardly and thus pivot latch member 11 in the counterclockwise locking direction until the projecting stops 11b, 11c engage the coupling head portions 9d and 9e, respectively. Latch portion 11a will then extend within the space 14 in the coupling head above the bail ear 10 to prevent disengagement of the bail ear from the cylinder head. The bail ear extremity extending within the space 14 has a semi-circular configuration which will readily permit pivotal movement of the bail ear with respect to the coupling head as the piston rod 7 is further extended to lift the car body 1 to the full dumping position of Figs. 2 and 5. It is to be noted however that at all times the roller 22 is out of engagement with the fixed guide cams 13, the weight of the control link 12 will maintain the latch member in its locking position illustrated in the figures. Thus the advantage of the invention presents itself that the rate of car dumping can be positively controlled without damage to the bail at any angle above approximately 5°.

Upon termination of the dumping of the ore from the car body the piston 7 is retracted within the hydraulic cylinder 6 to lower the car body to its initial horizontal state. As the rollers 22 engage the cam tracks 13 near the end of the retraction of the piston (i.e., when the car dumping angle $\alpha$ is approximately 5° or less), control link 12 will be caused to pivot in the clockwise direction about pivot shaft 21 to correspondingly effect clockwise movement of the latch member 11 until the portion 11a thereof is retracted from the coupling head opening 14, and thus to permit disengagement of the coupling head 9 from the bail ear 10 upon further retraction of the piston rod 7.

It should be mentioned here that one advantage presented by the gravity-cam linkage control means for operating the latch member 11 resides in the fact that the coupling head may be engaged with the bail ear at any dumping angle of the ore car body. For example, should the linkage be in the position shown in Fig. 5 with the bail out of engagement with the coupling head, the latch member 11 can be pivotally displaced in the clockwise direction merely by the downward force of the bail ear 10 as it is being inserted into the coupling head opening 14. This downward force upon the latch portion 11a need only be sufficient to overcome the counter-clockwise gravitational force applied to the latch through link 18 by the weight of the control link 12.

Also the latch may readily be retracted manually from the locking position shown in Figs. 4 and 5 merely by pivoting control link 12 in the clockwise direction.

While in accordance with the patent statutes we have illustrated and described the best embodiment of our invention now known to us, it will be apparent to those skilled in the art that changes may be made in the form of the invention described without deviating from the scope of our invention as set forth in the following claims.

We claim:

1. In an apparatus for upwardly tilting a pivotally-mounted vehicle body to a dumping position with respect to its chassis and including hydraulic lifting means mounted below said chassis adjacent the side of the vehicle body which is lifted upwardly, said lifting means having a hydraulic cylinder pivotally connected to a fixed support and an upwardly movable piston rod extending from said cylinder with a generally U-shaped coupling head thereon adapted to engagedly receive a bail ear on said vehicle body; the improvement which consists of latch means for maintaining said bail ear in positive engagement with said coupling head, said latch means comprising a latch element pivotally connected to said coupling head, a control lever pivotally connected at its upper portion to said coupling head so that said lever will normally hang by gravity from said coupling head, when said piston rod is extended from said cylinder, means connecting said control lever to said latch member to pivotally position said latch member in a locking position with respect to said bail ear when the bail is in engagement with said coupling head, and fixed guide cam means adjacent said hydraulic cylinder, said cam means being arranged for engagement by said control lever when said piston rod is retracted within said cylinder and said vehicle body is approximately positioned in its normal horizontal state, said cam means serving to pivot said control lever in a direction to cause said latch member to be displaced to a retracted unlocking position.

2. Apparatus as defined in claim 1 wherein said bail ear is received within the opening of the U-shaped coupling head and wherein a portion of the latch member extends within the coupling head opening above the bail ear when said latch member is in its locking position.

3. Apparatus as defined in claim 2 wherein the lower surface of the coupling head opening has a curved configuration adapted to receive by a rotatable connection a correspondingly curved extremity of the bail ear.

4. Apparatus as defined in claim 2 wherein said latch member has a generally bell-shaped configuration, said latch member being pivotally connected at its upper portion to said coupling head and having stop means thereon limiting the pivotal extent of travel of said member in the locking direction.

5. Apparatus as defined in claim 4 wherein said control lever is pivotally connected to said coupling head below the pivotal connection of said latch member to said coupling head.

6. Apparatus as defined in claim 5 wherein said means for connecting said control member includes at least one connecting link.

References Cited in the file of this patent

UNITED STATES PATENTS

| | | |
|---|---|---|
| 1,940,732 | Schmohl | Dec. 26, 1933 |
| 1,959,976 | Anderson et al. | May 22, 1934 |
| 2,671,531 | Holmstrom | Mar. 9, 1954 |